US011676260B2

(12) United States Patent
Jiang (10) Patent No.: US 11,676,260 B2
(45) Date of Patent: Jun. 13, 2023

(54) VARIATION-BASED SEGMENTATION FOR WAFER DEFECT DETECTION

(71) Applicant: KLA CORPORATION, Milpitas, CA (US)

(72) Inventor: Xuguang Jiang, San Jose, CA (US)

(73) Assignee: KLA CORPORATION, Milpitas, CA (US)

(*) Notice: Subject to any disclaimer, the term of this patent is extended or adjusted under 35 U.S.C. 154(b) by 225 days.

(21) Appl. No.: 17/024,681

(22) Filed: Sep. 17, 2020

(65) Prior Publication Data

US 2021/0097671 A1   Apr. 1, 2021

Related U.S. Application Data

(60) Provisional application No. 62/906,673, filed on Sep. 26, 2019.

(51) Int. Cl.
| G06T 7/00 | (2017.01) |
| G01N 21/88 | (2006.01) |
| G01N 21/95 | (2006.01) |
| G06T 7/136 | (2017.01) |
| G06T 7/11 | (2017.01) |

(52) U.S. Cl.
CPC ....... *G06T 7/0004* (2013.01); *G01N 21/8851* (2013.01); *G01N 21/9501* (2013.01); *G06T 7/11* (2017.01); *G06T 7/136* (2017.01); *G01N 2021/8887* (2013.01); *G06T 2207/30148* (2013.01)

(58) Field of Classification Search
USPC ........................................ 382/149, 167, 190
See application file for complete search history.

(56) References Cited

U.S. PATENT DOCUMENTS

| 6,178,260 B1* | 1/2001 | Li ............................ G06T 7/11 |
| | | 358/464 |
| 8,977,035 B2 | 3/2015 | Dalla-Torre et al. |
| 10,621,702 B1* | 4/2020 | Robison ................... G06T 5/20 |
| 2012/0256941 A1 | 10/2012 | Ballestad et al. |
| 2013/0188859 A1* | 7/2013 | Luo ........................ G06T 7/143 |
| | | 382/149 |
| 2015/0221076 A1 | 8/2015 | Gao et al. |
| 2017/0039690 A1 | 2/2017 | Atkins et al. |
| 2019/0147573 A1* | 5/2019 | Li ......................... H04N 1/6027 |
| | | 382/167 |
| 2020/0226722 A1* | 7/2020 | Pandey .................. G06T 5/002 |

FOREIGN PATENT DOCUMENTS

| JP | 2004138563 A | 5/2004 |
| JP | 2012026988 A | 2/2012 |

OTHER PUBLICATIONS

WIPO, ISR for PCT/US2020/051894, Jan. 4, 2021.
CNIPA, Office Action for CN Application No. 202080061765.X, Jan. 28, 2023 (see X/Y/A designations on p. 6).

* cited by examiner

*Primary Examiner* — Kathleen Y Dulaney
(74) *Attorney, Agent, or Firm* — Hodgson Russ LLP (57) ABSTRACT

Defects of interest and nuisance can be separated into different segments which enables detection of the defects of interest in only one segment. A region of an image can be segmented into a plurality of segments. A range attribute of the segments can be determined. Thresholding can be used to select one of the segments from the range attribute. The segment that is selected can be dilated.

17 Claims, 3 Drawing Sheets

VARIATION-BASED SEGMENTATION FOR WAFER DEFECT DETECTION

CROSS-REFERENCE TO RELATED APPLICATIONS

This application claims priority to the provisional patent application filed Sep. 26, 2019 and assigned U.S. App. No. 62/906,673, the disclosure of which is hereby incorporated by reference.

FIELD OF THE DISCLOSURE

This disclosure relates to semiconductor wafer inspection.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

In each processing step performed on a semiconductor wafer, the same circuit pattern is printed in each die on the wafer. Most wafer inspection systems take advantage of this fact and use a relatively simple die-to-die comparison to detect defects on the wafer. However, the printed circuit in each die may include many areas of patterned features that repeat in the X or Y direction such as the areas of DRAM, SRAM, or FLASH. This type of area is commonly referred to as an array area (the rest of the areas are called random or logic areas). To achieve better sensitivity, advanced inspection systems employ different strategies for inspecting the array areas and the random or logic areas.

Intensity may be used as a feature of segmentation to group similar intensity pixels together. Then, the same set of defect detection parameters are applied to all of the pixels in the same intensity-based group. However, this method has a number of disadvantages. For example, an intensity-based segmentation algorithm can be used when a geometry feature scatters uniformly. Often, this is not enough. For example, in an intensity-based or sum-of-intensity-based segmentation, a wafer image can be segmented into a quiet array segment, a noisy page break segment, and a noisy intersection segment. However, defects of interest (DOIs) in a quiet segment can be missed if a quiet segment is misclassified as a noisy segment. Segments also can be misclassified when the same cutline between segments leads to different segmentation in training and runtime. Such misclassification of the segments also may be bad for any pre-processing of the image, such as that which removes the periodic pattern in the page break area. As such, segmentation based purely on intensity or sum of intensity is prone to instability related to intensity variation from job-to-job during runtime. Therefore, other property-based segmentation is needed.

Another method for segmenting output of a dark field (DF) inspection system is projection-based segmentation (PBS). PBS provides a way to separate segments in regions based on the relative projected intensity in the X and Y directions. Most of the time, the PBS approach works well. However, since it is used in the pre-processing part of DF wafer inspection algorithms, there are cases when the PBS segmentation result fluctuates along the side of the underlying physical structure pattern, which makes the projection-based segmentation unstable. Some quiet segments are incorrectly segmented as noisy segments and vice versa. The impact is to cause the defect inspection to be less adaptive to local noise. Thus, PBS is generally used only when the region image contains major horizontal and/or vertical patterns.

An additional method for segmenting output of a dark field inspection system is median intensity-based segmentation (MBS). MBS is more stable than PBS because most of the time the median intensity differences between the array region and page break region are substantial, which provides easier separation between array and page break. However, the segment boundaries from the MBS can be irregular, which might not correlate to the underlying physical structure pattern. Thus, MBS is generally used if the defect and nuisance background intensities are different.

There are cases that do not meet the above criteria and thus the old segmentation methods are not applicable. Improved methods and systems are needed.

BRIEF SUMMARY OF THE DISCLOSURE

A system is provided in a first embodiment. The system comprises a light source that generates light; a stage configured to hold a wafer; a detector that receives the light reflected from the wafer; and a processor in electronic communication with the detector. The light source may be a laser. The processor is configured to perform segmentation of a region of an image into a plurality of segments, determine a range attribute for pixels in the region, apply a low pass filter to the range attribute, apply thresholding to select one of the segments from the range attribute, and apply dilation to the one of the segments along an X direction and a Y direction perpendicular to the X direction. The image is generated from data from the detector.

The range attribute can be determined by sorting intensity of pixels in a location of all dies of the image in ascending order and defining the range attribute by subtracting a second lowest intensity from a second highest intensity.

The range attribute also can be determined by sorting intensity of pixels in dies of the image in ascending order and defining the range attribute by using a lower of either a highest intensity minus a median intensity or the median intensity minus a lowest intensity.

The thresholding can select a first segment of the segments if the range attribute is less than or equal to a cutline and selects a second segment of the segments if the range attribute is greater than the cutline.

The processor can be further configured to combine at least two of the segments that have a low intensity.

The processor can be further configured to perform defect detection in one or more of the segments.

A method is provided in a second embodiment. The method comprises performing segmentation of a region of an image into a plurality of segments using a processor; determining a range attribute for pixels in the region using the processor; applying a low pass filter to the range attribute using the processor; applying thresholding to select one of the segments from the range attribute using the processor; and dilating the one of the segments along an X direction and a Y direction perpendicular to the X direction using the processor.

The range attribute can be determined by sorting intensity of pixels in a location of all dies of the image in ascending order and defining the range attribute by subtracting a second lowest intensity from a second highest intensity.

The range attribute also can be determined by sorting intensity of pixels in dies of the image in ascending order and defining the range attribute by using a lower of either a highest intensity minus a median intensity or the median intensity minus a lowest intensity.

The thresholding can select a first segment of the segments if the range attribute is less than or equal to a cutline and selects a second segment of the segments if the range attribute is greater than the cutline.

The method can further include combining at least two of the segments that have a low intensity using the processor.

The method can further include performing defect detection in one or more of the segments using the processor.

A non-transitory computer-readable storage medium is provided in a third embodiment. The non-transitory computer-readable storage medium comprises one or more programs for executing the following steps on one or more computing devices. The steps include receiving an image of a semiconductor wafer; performing segmentation of a region of the image into a plurality of segments; determining a range attribute for pixels in the region; applying a low pass filter to the range attribute; applying thresholding to select one of the segments from the range attribute; and dilating the one of the segments along an X direction and a Y direction perpendicular to the X direction.

The range attribute can be determined by sorting intensity of pixels in a location of all dies of the image in ascending order and defining the range attribute by subtracting a second lowest intensity from a second highest intensity.

The range attribute also can be determined by sorting intensity of pixels in dies of the image in ascending order and defining the range attribute by using a lower of either a highest intensity minus a median intensity or the median intensity minus a lowest intensity.

The thresholding can select a first segment of the segments if the range attribute is less than or equal to a cutline and selects a second segment of the segments if the range attribute is greater than the cutline.

The steps can further include combining at least two of the segments that have a low intensity.

The steps can further include performing defect detection in one or more of the segments.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Currently wafer defect detection tools have fairly good sensitivity in array and quiet logic areas. Embodiments disclosed herein can improve sensitivity in a general logic region, which is usually a noisy region. The variation-based segmentation (VBS) algorithm disclosed herein can separate a region image received from an inspection tool into different segments to suppress nuisance or false events and, thus, improve defect detection sensitivity. This VBS algorithm can enhance defect detection sensitivity and nuisance suppression. In difference images, DOI background is quieter than nuisance. Thus, difference image information can be used to separate DOI and nuisance.

Figure 1:
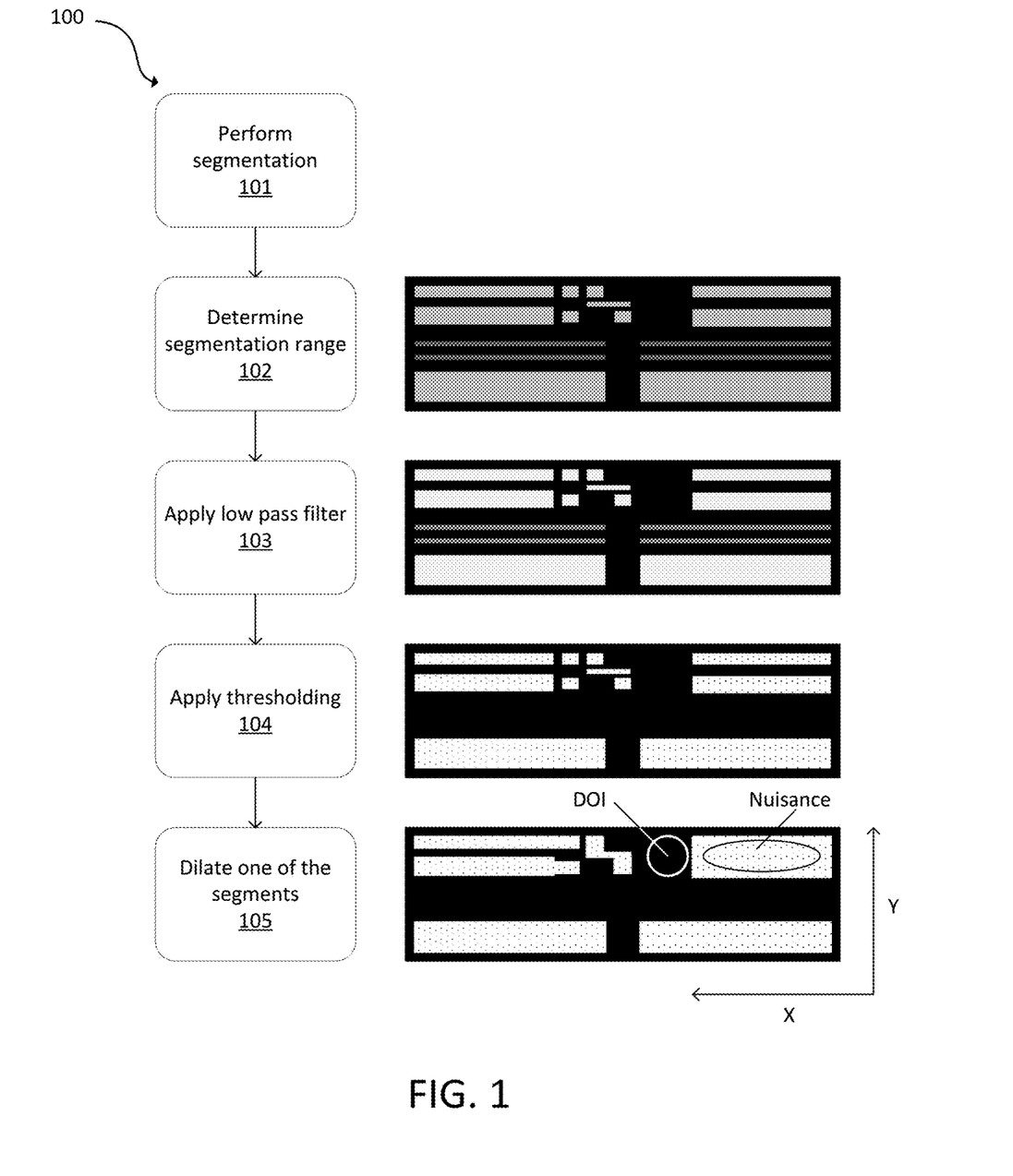
FIG. 1 is a flowchart of a method in accordance with the present disclosure with corresponding exemplary die images.

FIG. 1 is an embodiment of a method 100. Some or all of the steps of the method 100 can be performed using a processor. A diagram of an exemplary die image is shown next to each step. The method 100 can perform segmentation based on pixels in the image or images.

At 101, one or more images of a semiconductor wafer are received and/or region definition of the one or more images of a semiconductor wafer is received. Segmentation can be determined in the one or more regions. This divides the image or region of the image into segments. A region is a user-defined rectangle or polygonal area that separates the image into blocks that can include an array, page break, logic, etc. Thus, the region may be a logic region of an image of a semiconductor wafer. A segmentation method such as VBS can divide the logic region into segments.

At 102, a range attribute for each pixel in the region is determined, as shown by the boxes with different shades of grey for step 102 in FIG. 1. The range attribute can be determined differently depending on the number of images from step 101. Thus, the smallest and largest intensity can be removed if there are more pixels. The intensity or intensities that are removed can be based on the number of images. The range attribute determination can be used to perform the proposed VBS segmentation. The pixel range value is related to the noise in that pixel. Later steps can be based on this range attribute.

With four or more dies, the range attribute for each pixel location can be determined by sorting intensities of pixels in that location among all dies by intensity in ascending order. Thus, the range attribute can be calculated per pixel. The pixel intensity can be the grey intensity between black and white. The number of dies can be defined at a recipe setup stage. The range attribute is defined by subtracting a second lowest intensity from a second highest intensity. Thus, the range can be defined as a difference between intensities of the pixel at the same location in different images.

In an instance, for an N die case where N≥4, the intensity (I) of each pixel is sorted in ascending order (e.g., I1, I2, ... IN-1, IN). The range attribute is equal to IN-1–I2.

With three dies, the pixels can be sorted in ascending order. The range attribute is defined by using a lower of either a highest intensity minus a median intensity or the median intensity minus a lowest intensity.

In an instance, for a three die case each pixel is sorted in ascending order to determine a minimum, a median, and a maximum intensity. The range attribute is equal to the smaller of the maximum intensity minus the median intensity or the median intensity minus the minimum intensity.

The range attribute can be calculated as a difference between two intensity values. For an example with four or more dies, there are still two or more dies left after removing the highest intensity and the lowest intensity. However for a three-die example, there is only one value left if both the highest intensity and the lowest intensity are removed, which is not enough for range attribute calculation. So a different method can be used for three-die case to remove either the highest intensity or the lowest intensity, but not both. Most applications include three or more dies.

In an instance, instead of using intensity differences from each pixel, standard deviation within a certain neighborhood can be determined when calculating the range attribute.

A low pass filter is applied to the range attribute at 103. This can suppress potential variation caused by the DOI. For example, a mean filter or Gaussian filter can be used. The low pass filter can suppress the variation on the calculated range value at locations with a real defect. A defect pixel's intensity does not typically follow the same intensity distribution as non-defective pixels. A low pass filter can use neighboring pixels' range value to correct the impact from defect. After this step, the abnormally high or low values in the calculated ranges may be removed.

Thresholding is applied at 104 to select one of the segments from the range attribute. The thresholding selects a first segment of the segments if the range attribute is less than or equal to a cutline and selects a second segment of the segments if the range attribute is greater than the cutline. The cutline can be defined by a user. A user can use different cutlines until a desired segmentation result is achieved.

In an instance, there are multiple thresholds [Th0, Th1, ..., ThN]. VBS can be performed to define a first segment (seg0) if the range attribute is ≤Th0. VBS can be performed to define a second segment (seg1) if Th0<range attribute≤Th1. Additional segments can be defined accordingly.

The segment that is selected in the thresholding is dilated along the X direction and Y direction at 105. The Y direction is perpendicular to the X direction. This can be used to cover the neighbor areas of high noise areas, as shown in diagram of FIG. 1. While the diagrams in FIG. 1 include rectangles, the segments can be other shapes such as circles, ovals, triangles, squares, or polygons.

For example, to dilate seg1 into seg0, if a pixel in seg0 is next to a pixel in seg1, then the pixel's segment is set to seg1 (i.e., seg1's size grows). The assumption behind dilation is that the neighbor of a noisy area is also noisy. Due to intensity variation, steps 102-104 may not correctly segment every pixel. Dilation can extend the segment to cover neighboring areas.

In an instance of step 102, DOI and nuisance are in similar image background. So they are in the same segment when using existing segmentation method. In step 105 they are in different segment. The detailed location inside of the segments may not matter.

With VBS, low variation and high variation areas can be separated into different segments. Low variation segments can be used to enhance defect detection while high variation segments can be used for nuisance suppression.

Neither PBS nor MBS can be applied when both DOI and nuisance are located in random logic region with similar background intensity. DOI and nuisance are either both detected or both lost. There is no way to only detect the DOI. With the VBS algorithm disclosed herein, DOI and nuisance are separated into different segments and, therefore, it is possible to only detect DOI in one segment.

Figure 2A:
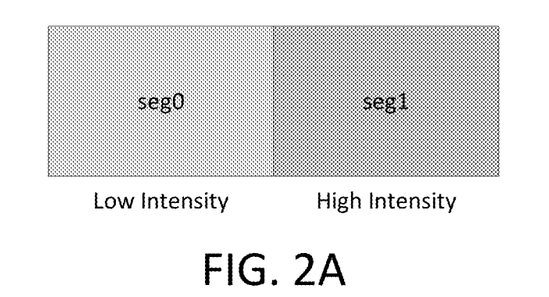
FIGS. 2A-2C are diagrams illustrating another embodiment of a method in accordance with the present disclosure.
Figure 2B:
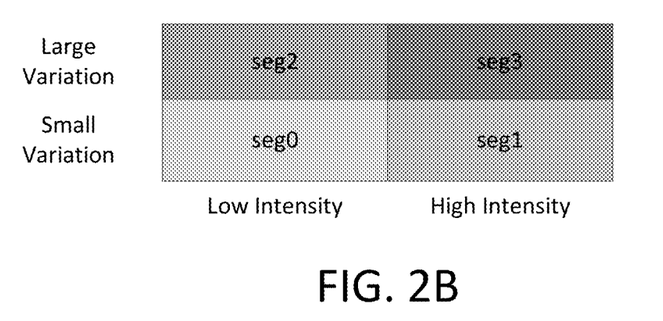
Figure 2C:
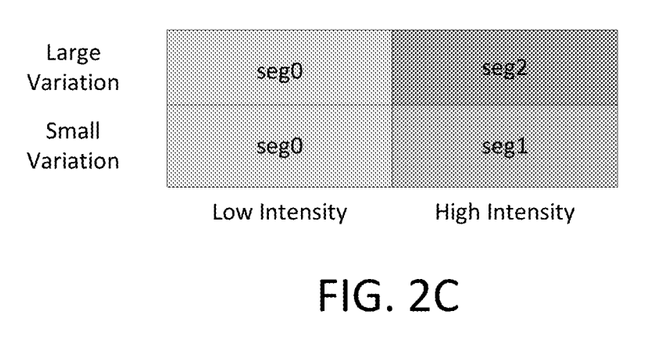

The method 100 can optionally include combining at least two of the segments that have a low intensity using the processor. For example, MBS can be used to combine segments. This is illustrated in FIGS. 2A-2C.

MBS outputs two or more segments. In a standard MBS use case, two segments are used. As shown in FIG. 2A, seg0 can be used for improved sensitivity and seg1 can be used for nuisance suppression. There can be variation in each segment. VBS can further divide each MBS segment into additional segments, as shown in FIG. 2B. MBS's seg0 is divided into seg0 and seg2. MBS's seg1 is divided into seg1 and seg3.

In an example combining MBS with the VBS algorithm disclosed herein, seg0 and seg2 have the same sensitivity. Improved defect detection can be performed in seg1, and nuisance can be suppressed in seg3. Thus, seg0 and seg2 in FIG. 2B can be combined, which results in the segmentation of FIG. 2C. The combination in FIG. 2C can preserve the seg0 sensitivity, new defects can be detected in the previous seg1, and nuisance can be suppressed in the remaining seg2 (previously seg3).

Figure 3:
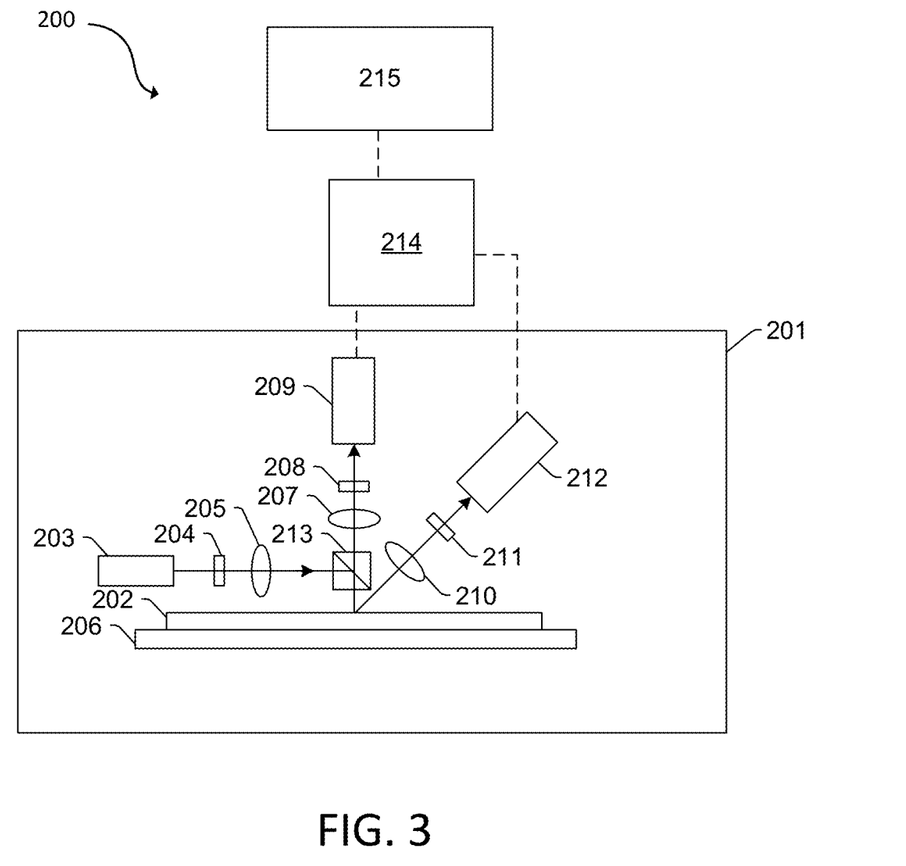
FIG. 3 is a system in accordance with the present disclosure.

One embodiment of a system 200 is shown in FIG. 3. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen 202 includes a reticle. The reticle may include any reticle known in the art.

In the embodiment of the system 200 shown in FIG. 3, optical based subsystem 201 includes an illumination subsystem configured to direct light to specimen 202. The illumination subsystem includes at least one light source. For example, as shown in FIG. 3, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 3, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 3. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 3 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 3) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 3 as a single refractive optical element, it is to be understood that, in practice, lens 205 may include a number of refractive and/or reflective optical elements that in combination focus the light from the optical element to the specimen. The illumination subsystem shown in FIG. 3 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 3 includes two detection channels, one formed by collector 207, element 208, and detector 209 and another formed by collector 210, element 211, and detector 212. As shown in FIG. 3, the two detection channels are configured to collect and detect light at different angles of collection. In some instances, both detection channels are configured to detect scattered light, and the detection channels are configured to detect tight that is scattered at different angles from the specimen 202. However, one or more of the detection channels may be configured to detect another type of light from the specimen 202 (e.g., reflected light).

As further shown in FIG. 3, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 3 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 3 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 3 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 3 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with a scanning electron microscope.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 can be configured to perform any of the embodiments disclosed herein, such as the method 100 of FIG. 1. In an instance, the processor 214 is configured to perform segmentation of a region of an image into a plurality of segments; determine a range attribute for pixels in the region; apply a low pass filter to the range attribute; apply thresholding to select one of the segments from the range attribute; and apply dilation to the one of the segments along an X direction and a Y direction perpendicular to the X direction.

The range attribute can be determined by sorting intensity of pixels in a location of all dies of the image in ascending order and defining the range attribute by subtracting a second lowest intensity from a second highest intensity.

The range attribute also can be determined by sorting intensity of pixels in dies of the image in ascending order and defining the range attribute by using a lower of either a highest intensity minus a median intensity or the median intensity minus a lowest intensity.

The thresholding can select a first segment of the segments if the range attribute is less than or equal to a cutline or a second segment of the segments if the range attribute is greater than the cutline.

The processor 214 can be further configured to combine at least two of the segments that have a low intensity.

An additional embodiment relates to a non-transitory computer-readable medium storing program instructions executable on a controller for performing a computer-implemented method for wafer inspection, as disclosed herein. In particular, as shown in FIG. 3, electronic data storage unit 215 or other storage medium may contain non-transitory computer-readable medium that includes program instructions executable on the processor 214. The computer-implemented method may include any step(s) of any method(s) described herein, including method 100.

In an instance, the steps include receiving an image of a semiconductor wafer; performing segmentation of a region of the image into a plurality of segments; determining a range attribute for pixels in the region; applying a low pass filter to the range attribute; applying thresholding to select one of the segments from the range attribute; and dilating the one of the segments along an X direction and a Y direction perpendicular to the X direction.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Other types of wafers also may be used. For example, the wafer may be used to manufacture LEDs, solar cells, magnetic discs, flat panels, or polished plates. Defects on other objects also may be classified using techniques and systems disclosed herein.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a light source that generates light;
   a stage configured to hold a wafer;
   a detector that receives the light reflected from the wafer; and
   a processor in electronic communication with the detector, wherein the processor is configured to:
   perform segmentation of a region of an image into a plurality of segments, wherein the image is generated from data from the detector;
   determine a range attribute for pixels in the region, wherein the range attribute is determined by:
   sorting intensity of pixels of the image in ascending order; and
   defining the range attribute by subtracting a second lowest intensity from a second highest intensity or by using a lower of either a highest intensity minus a median intensity or the median intensity minus a lowest intensity;
   apply a low pass filter to the range attribute;
   apply thresholding to select one of the segments from the range attribute; and
   apply dilation to the one of the segments along an X direction and a Y direction perpendicular to the X direction.

2. The system of claim 1, wherein the light source is a laser.

3. The system of claim 1, wherein the range attribute is determined by:
   sorting the intensity of pixels in a location of all dies of the image in ascending order; and
   defining the range attribute by subtracting the second lowest intensity from the second highest intensity.

4. The system of claim 1, wherein the range attribute is determined by:
   sorting the intensity of pixels in dies of the image in ascending order; and
   defining the range attribute by using the lower of either the highest intensity minus a median intensity or the median intensity minus the lowest intensity.

5. The system of claim 1, wherein the thresholding selects a first segment of the segments if the range attribute is less than or equal to a cutline and selects a second segment of the segments if the range attribute is greater than the cutline.

6. The system of claim 1, wherein the processor is further configured to combine at least two of the segments that have a low intensity.

7. The system of claim 1, wherein the processor is further configured to perform defect detection in one or more of the segments.

8. A method comprising:
   performing segmentation of a region of an image into a plurality of segments using a processor;
   determining a range attribute for pixels in the region using the processor, wherein the range attribute is determined by:
   sorting intensity of pixels of the image in ascending order; and
   defining the range attribute by subtracting a second lowest intensity from a second highest intensity or by using a lower of either a highest intensity minus a median intensity or the median intensity minus a lowest intensity;
   applying a low pass filter to the range attribute using the processor;
   applying thresholding to select one of the segments from the range attribute using the processor;
   dilating the one of the segments along an X direction and a Y direction perpendicular to the X direction using the processor; and
   performing defect detection in one or more of the segments using the processor.

9. The method of claim 8, wherein the range attribute is determined by:
   sorting the intensity of pixels in a location of all dies of the image in ascending order; and
   defining the range attribute by subtracting the second lowest intensity from the second highest intensity.

10. The method of claim 8, wherein the range attribute is determined by:
    sorting the intensity of pixels in dies of the image in ascending order; and
    defining the range attribute by using a lower of either the highest intensity minus the median intensity or the median intensity minus the lowest intensity.

11. The method of claim 8, wherein the thresholding selects a first segment of the segments if the range attribute is less than or equal to a cutline and selects a second segment of the segments if the range attribute is greater than the cutline.

12. The method of claim 8, further comprising combining at least two of the segments that have a low intensity using the processor.

13. A non-transitory computer-readable storage medium, comprising one or more programs for executing the following steps on one or more computing devices:
    receiving an image of a semiconductor wafer;
    performing segmentation of a region of the image into a plurality of segments;
    determining a range attribute for pixels in the region, wherein the range attribute is determined by:
    sorting intensity of pixels of the image in ascending order; and
    defining the range attribute by subtracting a second lowest intensity from a second highest intensity or by using a lower of either a highest intensity minus a median intensity or the median intensity minus a lowest intensity;
    applying a low pass filter to the range attribute;
    applying thresholding to select one of the segments from the range attribute;
    dilating the one of the segments along an X direction and a Y direction perpendicular to the X direction; and
    performing defect detection in one or more of the segments.

14. The non-transitory computer-readable storage medium of claim 13, wherein the range attribute is determined by:
    sorting the intensity of pixels in a location of all dies of the image in ascending order; and
    defining the range attribute by subtracting the second lowest intensity from the second highest intensity.

15. The non-transitory computer-readable storage medium of claim 13, wherein the range attribute is determined by:
 sorting the intensity of pixels in dies of the image in ascending order; and
 defining the range attribute by using a lower of either the highest intensity minus the median intensity or the median intensity minus the lowest intensity.

16. The non-transitory computer-readable storage medium of claim 13, wherein the thresholding selects a first segment of the segments if the range attribute is less than or equal to a cutline and selects a second segment of the segments if the range attribute is greater than the cutline.

17. The non-transitory computer-readable storage medium of claim 13, wherein the steps further include combining at least two of the segments that have a low intensity.

\* \* \* \* \*